US012746624B2

(12) United States Patent
Tanaka et al.

(10) Patent No.: US 12,746,624 B2
(45) Date of Patent: Sep. 29, 2026

(54) WELDING MEASURING SYSTEM AND WELDING MEASURING METHOD

(71) Applicant: HITACHI CONSTRUCTION MACHINERY CO., LTD., Tokyo (JP)

(72) Inventors: Akihide Tanaka, Tokyo (JP); Kazumichi Hosoya, Ibaraki (JP); Kazutoshi Sugie, Tokyo (JP); Xudong Zhang, Tokyo (JP); Isamu Takahashi, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 799 days.

(21) Appl. No.: 18/027,956

(22) PCT Filed: Sep. 22, 2021

(86) PCT No.: PCT/JP2021/034798

§ 371 (c)(1),
(2) Date: Mar. 23, 2023

(87) PCT Pub. No.: WO2022/065364

PCT Pub. Date: Mar. 31, 2022

(65) Prior Publication Data

US 2023/0330785 A1 Oct. 19, 2023

(30) Foreign Application Priority Data

Sep. 25, 2020 (JP) ................................ 2020-160586

(51) Int. Cl.
*B23K 31/12* (2006.01)
*B23K 9/095* (2006.01)

(52) U.S. Cl.
CPC .......... *B23K 31/125* (2013.01); *B23K 9/0953* (2013.01); *B23K 9/0956* (2013.01)

(58) Field of Classification Search
CPC .......... B23K 31/125; B23K 9/00; B23K 9/02; B23K 9/0209; B23K 9/095; B23K 9/0953; B23K 9/0956; B23K 9/32
See application file for complete search history.

(56) References Cited

U.S. PATENT DOCUMENTS

2016/0267806 A1* 9/2016 Hsu .......................... G09B 5/02
2020/0055148 A1 2/2020 Hsu

FOREIGN PATENT DOCUMENTS

CN 104588837 A 5/2015
JP 51-3344 A 1/1976
(Continued)

OTHER PUBLICATIONS

International Search Report of PCT/JP2021/034798 dated Dec. 7, 2021.
(Continued)

*Primary Examiner* — Elton K Wong
(74) *Attorney, Agent, or Firm* — MATTINGLY & MALUR, PC

(57) ABSTRACT

An object of the present invention is to provide a welding measuring system and a welding measuring method that can steadily photograph a welding phenomenon in manual arc welding in which the moving speed of a torch changes irregularly. To this end, a welding measuring system for measuring a welding phenomenon in manual arc welding includes: a camera rail disposed along a welding line; a camera movable on the camera rail; a camera driving device that drives the camera; and a computer that senses a position of an arc within an image photographed by the camera, and controls the camera driving device such that the camera moves at a speed at which the position of the arc continues to be displayed within a predetermined region within the image photographed by the camera.

8 Claims, 12 Drawing Sheets

(56) References Cited

FOREIGN PATENT DOCUMENTS

| | | | |
|---|---|---|---|
| JP | 2-123877 | A | 5/1990 |
| JP | 2012-106317 | A | 6/2012 |
| JP | 2013-091086 | A | 5/2013 |

OTHER PUBLICATIONS

International Preliminary Report on Patentability received in corresponding International Application No. PCT/JP2021/034798 dated Apr. 6, 2023.
Chinese Office Action received in corresponding Chinese Application No. 202180064829.6 dated Jan. 20, 2026.

* cited by examiner

WELDING MEASURING SYSTEM AND WELDING MEASURING METHOD

TECHNICAL FIELD

The present invention relates to a system and a method for measuring a welding phenomenon.

BACKGROUND ART

Under recent social conditions, a craftsmanship environment has been changing greatly. For example, due to an increase in overseas production, an increase in articles procured from abroad, and a decrease in skilled technicians, it has become difficult to maintain craftsmanship skills, and quality control is subjected to harsher conditions. As a skill handing-down method thus far, skills have been handed down by direct instruction from skilled technicians. However, means for conveying skills are not sufficient, and intuitive instruction is often provided. Thus, the instruction takes time, or skills are conveyed inaccurately. There is therefore a fear that the skills may not be handed down completely or lost.

On the other hand, due to the development of a measurement technology in recent years, there have appeared to be efforts to measure and evaluate skills of craftsmanship. As a method for solving problems in the conventional transmission of skills, efforts have been made to measure and evaluate the work of target persons by using various measuring apparatuses. A method has been proposed which evaluates quality by comparing measured data with data measured in the past, and uses the evaluation for quality control and welding work training. There is Patent Document 1, for example, as a prior art document disclosing such a method.

Patent Document 1 discloses a welding skill evaluation device including: a molten pool observation camera that is movably fixed to a welding device and moves as welding progresses, and observes a torch behavior and a molten pool surface behavior; a penetration bead observation camera that moves integrally with the molten pool observation camera, and measures the molten state of the reverse side of a molten pool; a torch camera that is attached to a welding torch, and monitors a molten state and an arc state; a whole behavior photographing camera that photographs the posture of a welder and general conditions of a welding portion; a monitor that displays images imaged by these four cameras together with a welding current and a voltage signal obtained from a welding current and welding voltage measuring device; a storage device that stores and analyzes the image information imaged by the four cameras together with the welding current and the voltage signal obtained from the welding current and welding voltage measuring device; and a welding face shield equipped with a small monitor that displays any one of the images imaged by the four cameras.

In addition, in regard to a moving method for the molten pool observation camera and the penetration bead observation camera, Patent Document 1 includes the following description: the "molten pool observation camera and the penetration bead observation camera in the welding skill evaluation device according to the present invention are installed above and below a base material, and are moved integrally along a groove as welding progresses. The moving speed of the molten pool observation camera and the penetration bead observation camera can be set to be a predetermined model speed, and can be set to be a speed synchronous with the moving speed of the welding torch which moving speed is analyzed on the basis of the image information from the whole behavior photographing camera that photographs the posture of the welder."

PRIOR ART DOCUMENT

Patent Document

Patent Document 1: JP-2013-91086-A

SUMMARY OF THE INVENTION

Problem to be Solved by the Invention

However, in a case where the moving speed of the molten pool observation camera is set to be the "predetermined model speed," when the moving speed falls outside the "predetermined model speed," a photographing distance and a photographing angle with respect to a welding pool vary, so that a welding phenomenon cannot be photographed steadily.

In addition, although there is a description stating that the moving speed of the molten pool observation camera "can be set to be a speed synchronous with the moving speed of the welding torch which moving speed is analyzed on the basis of the image information from the whole behavior photographing camera that photographs the posture of the welder," it takes time to calculate the moving speed of the welding torch on the basis of the image information from the whole behavior photographing camera. There is thus a fear of being unable to ensure a capability of the molten pool observation camera to follow the movement of the welding torch.

In addition, in a case of the above-described method, when a camera arrangement or a welding position changes, and an imaging condition changes accordingly, an image processing parameter needs to be adjusted again. Further, there is a fear of being unable to ensure the following capability of the molten pool observation camera when the arc state changes during welding and an optimum imaging condition changes accordingly.

The present invention has been made in view of the above-described problems. It is an object of the present invention to provide a welding measuring system and a welding measuring method that can steadily photograph a welding phenomenon in manual arc welding in which the moving speed of a torch changes irregularly.

Means for Solving the Problem

In order to achieve the above object, according to the present invention, there is provided a welding measuring system for measuring operation of a welder in manual arc welding, the welding measuring system including: a first camera rail disposed along a welding line; a first camera movable on the first camera rail; a first camera driving device that drives the first camera; and a computer configured to sense a position of an arc within an image photographed by the first camera, and control the first camera driving device such that the first camera moves at a speed at which the position of the arc continues to be displayed within a predetermined region within the image photographed by the first camera.

In addition, according to the present invention, there is provided a welding measuring method for measuring a welding phenomenon in manual arc welding by moving a camera, the welding measuring method including: a step of adjusting a position of the camera such that a welding start point is included in an angle of view of the camera before the welding is started; a step of starting photographing by the camera before the welding is started; a step of moving the camera such that a position of an arc within an image photographed by the camera continues to be displayed within a predetermined region within the image after the welding is started; and a step of stopping moving the camera and continuing the photographing by the camera in a case where the arc disappears.

According to the present invention configured as described above, in the manual arc welding in which the moving speed of a torch changes, the arc can be captured in the predetermined region within the image photographed by the camera, and therefore a welding phenomenon can be photographed steadily.

Advantages of the Invention

According to the present invention, it is possible to photograph a welding phenomenon steadily in manual arc welding in which the moving speed of a torch changes irregularly.

MODES FOR CARRYING OUT THE INVENTION

Figure 1:
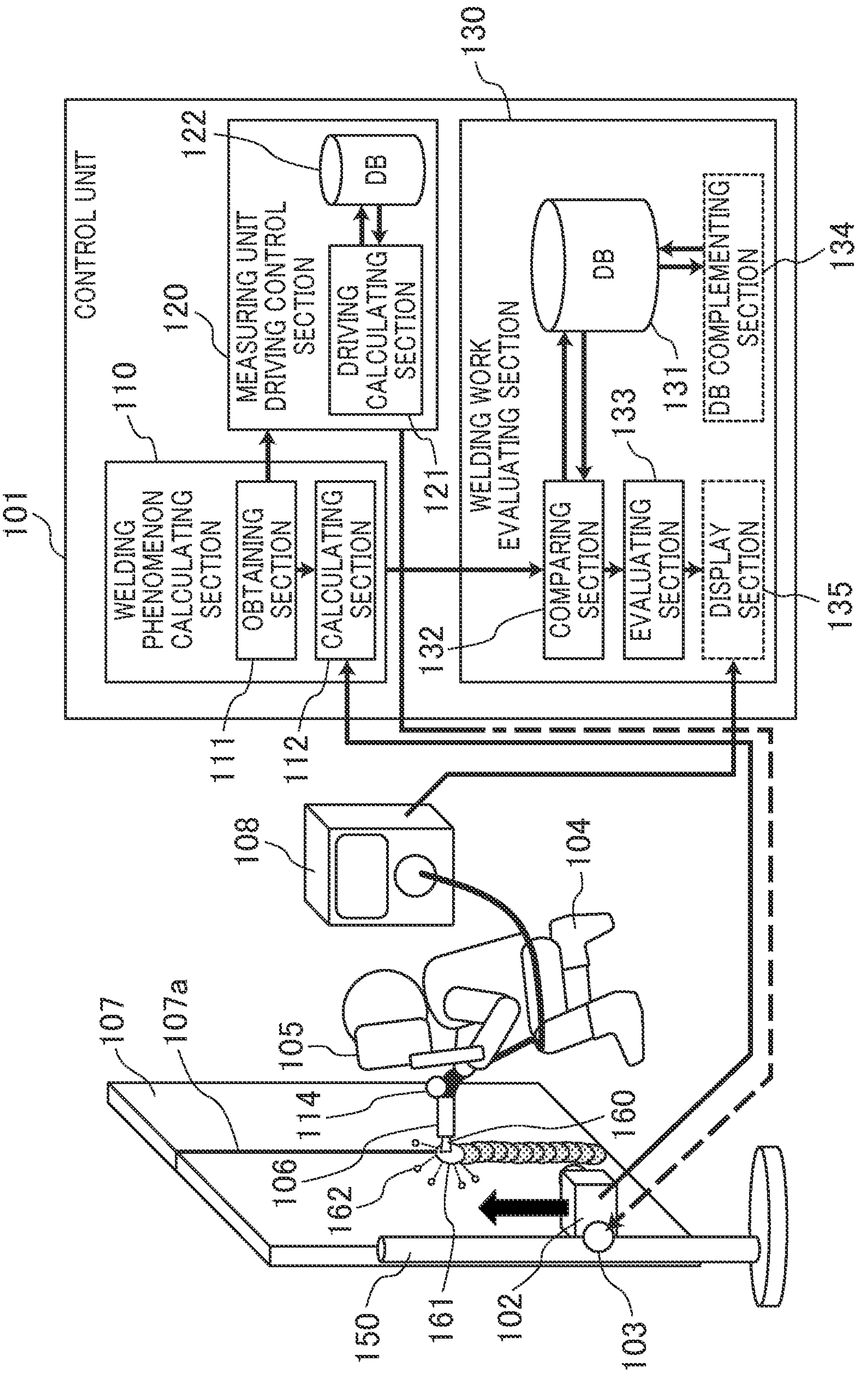
FIG. 1 is a diagram showing a general configuration of a welding measuring system in a first embodiment of the present invention.

Embodiments of the present invention will hereinafter be described with reference to the drawings. Incidentally, in each figure, equivalent elements are identified by the same reference numerals, and repeated description thereof will be omitted as appropriate.

First Embodiment

FIG. 1 is a diagram showing a general configuration of a welding work measuring system in a first embodiment of the present invention. Welding work assumes vertical upward welding. Suppose that a test piece, which is not depicted in the figure, has a V-groove. In addition, suppose that welding is MAG welding with many spatters.

In FIG. 1, reference numeral 101 denotes a control unit, reference numeral 102 denotes a welding phenomenon measuring unit, reference numeral 103 denotes a measuring unit driving unit, reference numeral 104 denotes a welder, reference numeral 105 denotes a face shield, reference numeral 106 denotes a welding torch, reference numeral 107 denotes a welding target object, and reference numeral 108 denotes a semiautomatic welding power supply. The control unit 101 is, for example, a computer including a computation processing device (for example, a CPU), a storage device that stores a program to be executed by the computation processing device and data (the storage device is, for example, a semiconductor memory such as a ROM or a RAM and a magnetic storage device such as an HDD, and a "storage unit" to be described later corresponds to the storage device), and a display device (for example, a monitor or a touch panel) that displays a computation result of the computation processing device.

The control unit 101 includes: a welding phenomenon calculating section 110 that obtains information obtained from the welding phenomenon measuring unit 2, and performs calculation as appropriate; a measuring unit driving control section 120 that calculates control of the measuring unit driving unit 103 on the basis of information of the welding phenomenon calculating section 110, and controls the measuring unit driving unit 103; and a welding work evaluating section 130 that evaluates welding quality and welding work on the basis of the information of the welding phenomenon calculating section 110. These pieces of processing are executed within the computer for the processing.

The welding phenomenon calculating section 110 includes: an obtaining section 111 that obtains a welding phenomenon; and a calculating section 112 that calculates information such as the shape and area of a molten pool 161 as appropriate on the basis of the obtained welding phenomenon.

The measuring unit driving control section 120 includes a driving calculating section 121 and a database 122. Details of the driving calculating section 121 will be described by using a flowchart to be described later.

The welding work evaluating section 130 includes: a database 131 that stores data for calculating welding work and welding quality on the basis of the information of the welding phenomenon calculating section 110; a comparing section 132 that compares an actual welding phenomenon with a welding phenomenon stored in the database 131; and an evaluating section 133 that evaluates the welding work from a comparison result of the comparing section 132.

In addition, a configuration may be adopted which includes a database complementing section 134 that interpolates data from the existing database 131 even in a case of a welding phenomenon whose description is not in the database 131. In addition, a configuration may be adopted which includes a display section 135 that displays a result of the evaluation evaluated by the evaluating section 133. The display section 135 may be configured to display a current and a voltage value during welding by connecting the control unit 101 to a digital welding power supply.

With regard to the comparing section 132 and the evaluating section 133, it is preferable to be able to extract, evaluate, and display items such as the luminance, longitudinal length, lateral length, area, circularity, and aspect ratio of the molten pool 161. In the present embodiment, a distance from the welding phenomenon measuring unit 102 to a welding position is constant, and therefore a welding phenomenon can be compared with higher accuracy than conventional.

In addition, the comparing section 132 may be configured to calculate an ideal welding phenomenon by machine learning from the welding phenomena of a large number of skilled welding workers without referring to the database 131 in which welding phenomena are recorded.

The display section 135 may be configured to display information to a person present outside a welding booth by using a display, or may be configured to display information in the face shield 105 by using a small display or the like and thereby sequentially feed back welding information to the welder 104.

In actual work, the movement of the torch 106 when the welder 104 as a worker welds the welding target object 107 is measured. The welding phenomenon measuring unit 102 is disposed on the periphery of the welder 104 and the welding target object 107. The welding phenomenon measuring unit 102 is provided so as to be movable on a camera rail 150. The camera rail 150 is disposed in parallel with a welding line 107*a* of the welding target object 107.

A CMOS camera, a high-speed camera, or the like is cited as the welding phenomenon measuring unit 102. In order to obtain a welding phenomenon, it is preferable to use a light attenuating filter that cuts light as a whole as appropriate, or a short-pass filter, a long-pass filter, or a band-pass filter that cuts wavelengths, or the like. The filters may use wavelengths in a region of 900 to 1000 nm, for example. In addition, a state of less susceptibility to damage from fumes and spatters 162 is preferably attained by using a protective glass.

The welding phenomenon measuring unit 102 may include two kinds or more of measuring devices other than a camera. A thermocamera, for example, is cited as another measuring device. In addition, measurement may be performed with a plurality of cameras. In that case, a method of three-dimensional conversion by using principles of a stereo camera or the like may be included.

The measuring unit driving unit 103 drives the welding phenomenon measuring unit 102 so as to follow the operation of the welder 104. A mechanism capable of driving in parallel with the welding line 107*a* is preferable. In the present embodiment, vertical upward welding is performed, and therefore the measuring unit driving unit 103 is also configured to move upward from a lower side. When there is an R-portion in the welding line 107*a*, it is preferable that the camera rail 150 be also provided with a similar R-portion in the same manner. Disposing the camera rail 150 in parallel with the welding line 107*a* enables a welding phenomenon to be photographed while a photographing environment such as a distance from the welding phenomenon measuring unit 102 to the welding position and an angle of the welding phenomenon measuring unit 102 with respect to the welding position is held constant even when the torch 106 moves.

The measuring unit driving unit 103 preferably has a function of obtaining a welding speed or the like by sending a moving speed or the like of the measuring unit driving unit 103 itself to the control unit 1 as appropriate. In that case, the control unit 1 may evaluate the welding work and the welding quality on the basis of the obtained welding speed.

Figure 2:
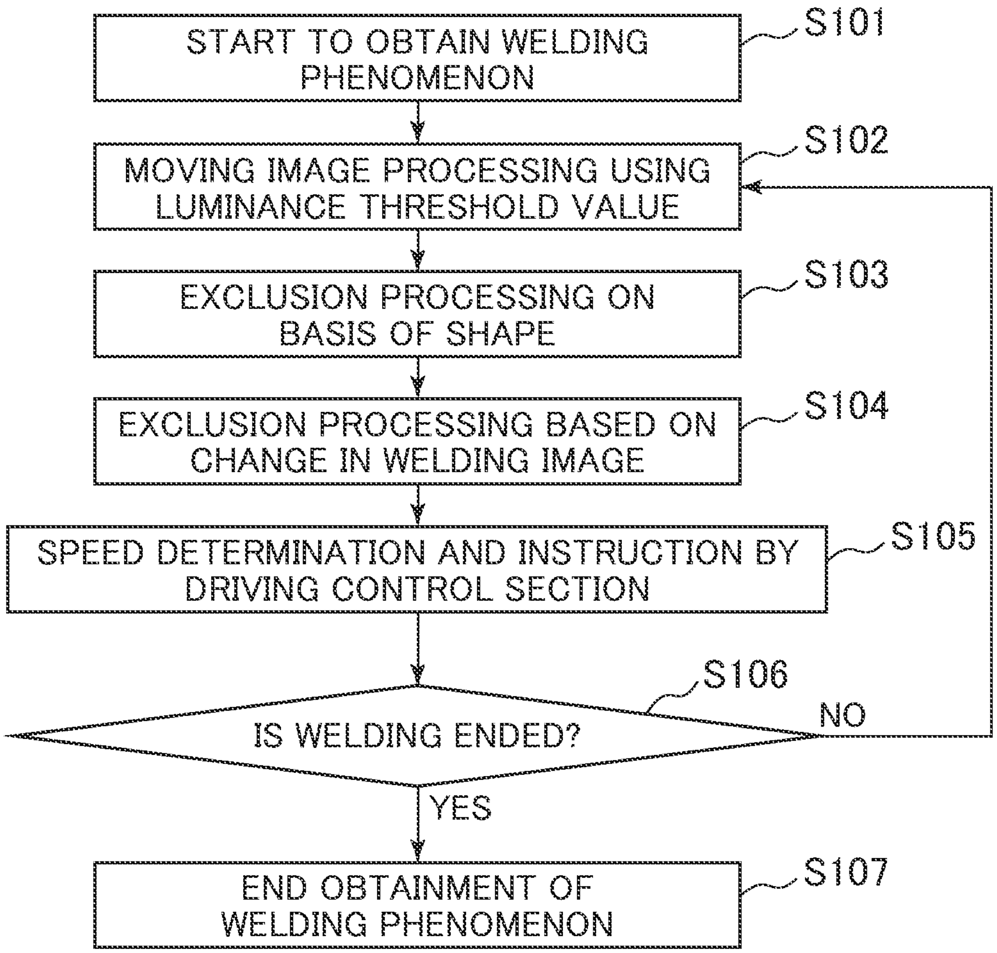
FIG. 2 is a flowchart showing processing of a control unit in the first embodiment of the present invention.

FIG. 2 is a flowchart showing processing of the control unit 101. In the following, the flowchart will be described according to a series of evaluations of actual welding work.

At a time of control of the measuring unit driving unit 103, the control is performed on the basis of the information of the welding phenomenon measuring unit. In the welding phenomenon, however, the spatters 162, a fume, a groove edge portion brightened by arc light, and the like are measured separately from the torch 106 and a wire and the movement of the torch 106 and an arc 160 occurring at a distal end of the wire. It is therefore important to drive the welding phenomenon measuring unit 102 with the torch 106 and the arc 160 occurring at a distal end of the torch as marks while excluding those pieces of information.

Calculations described in the present flowchart are processing in a case of particularly frequent occurrence of those pieces of information, but may be omitted as appropriate in TIG welding or the like in which the spatters 162 do not occur very much. In order to retain a real-time characteristic, it is preferable to omit processing that does not need to be used.

In step S101, as work is started, the obtainment of a welding phenomenon and control of the driving unit are started. This evaluation may be performed slightly before the welding work, or measurement may be automatically started with a signal at a time of an arc ignition as a cue.

Step S102 performs processing of binarizing an obtained image by using a luminance threshold value. This processing is used to remove other information such as the groove, the fume, and the molten pool 161 as much as possible while recognizing the arc 160, the torch 106, and the wire. The groove and the fume often have a lower luminance than arc light. However, when it is difficult to distinguish the groove and the fume, the threshold value may be set at a low value, and the groove and the fume may be distinguished in a step to be described later. In addition, the spatters 162 are bright in most cases, and are thus not distinguished here. The threshold value changes also according to the kind of the filter, the diaphragm of the camera, the current, and the like, and therefore a function of being able to set the threshold value is preferably provided.

Step S103 performs processing of exclusion from the binarized image by using the threshold value on the basis of an image position, a longitudinal length, a lateral length, an area, circularity, and an aspect ratio. This processing is performed to remove the spatters 162 as well as the groove and the like that cannot be distinguished in step S102.

Step S104 is a step of exclusion on the basis of a change by comparing the luminance, the longitudinal length, the image position, the lateral length, the area, the circularity, and the aspect ratio obtained by binarization, which are calculated in step S102 and step S103, between the past and the present. For example, the moving speed of the spatters 162 is generally often higher than the moving speed of the torch 106, and therefore a method of excluding the spatters 162 by comparison with a past speed is conceivable.

Step S105 is a method of performing control on the basis of data after processing in steps S102 to S104. This includes using an average value or a centroid of remaining coordinate information or the like. The measuring unit driving unit 103 is controlled such that the centroid is fixed when the centroid changes.

Step S106 determines whether or not to end the welding phenomenon obtainment. When a result of the determination is NO, steps S102 to S106 continue to be processed in a loop until the welding phenomenon measurement is ended. When the result of the determination is YES, the processing proceeds to a next step.

Step S107 ends the welding phenomenon obtainment.

The application of the processing of various kinds of items and the threshold value in the above-described flow can be preferably easily set on a system. In addition, with regard to the control of the measuring unit driving unit 103, there are preferably an upper limit speed, an upper limit acceleration, and a parameter capable of adjusting sensitivity such as a gain.

In the present embodiment, a welding operation measuring system for measuring the operation of the welder in manual arc welding includes: the camera rail 150 disposed in parallel with the welding line 107*a*; a camera 102 movable on the camera rail 150; a camera driving device 103 that drives the camera 102; and a computer 101 configured to calculate the position of the arc 160 on the basis of an image photographed by the camera 102, and control the camera driving device 103 such that the camera 102 moves so as to follow the position of the arc 160.

According to the welding measuring system according to the present embodiment configured as described above, it is possible to photograph the welding phenomenon while holding constant a distance from the camera 102 to the molten pool 161 and an angle of the camera 102 with respect to the molten pool 161. It is thereby possible to photograph the welding phenomenon steadily in manual arc welding in which the moving speed of the torch 106 changes irregularly.

In addition, the computer 101 in the present embodiment calculates a physical quantity (the luminance, the longitudinal length, the lateral length, the area, the circularity, the aspect ratio, or the like) representing the molten pool 161 on the basis of the image photographed by the camera 102, and displays the physical quantity representing the molten pool 161 together with the image photographed by the camera 102. It is thereby possible to grasp the state of the molten pool 161 quantitatively while checking the welding phenomenon.

In addition, the computer 101 in the present embodiment determines whether the welding quality is good or not on the basis of whether or not the physical quantity representing the molten pool 161 falls within a reference value. The management of the welding quality is thereby made possible.

Second Embodiment

Description of a welding operation measuring system according to a second embodiment of the present invention will be made centering on differences from the first embodiment.

Figure 3:
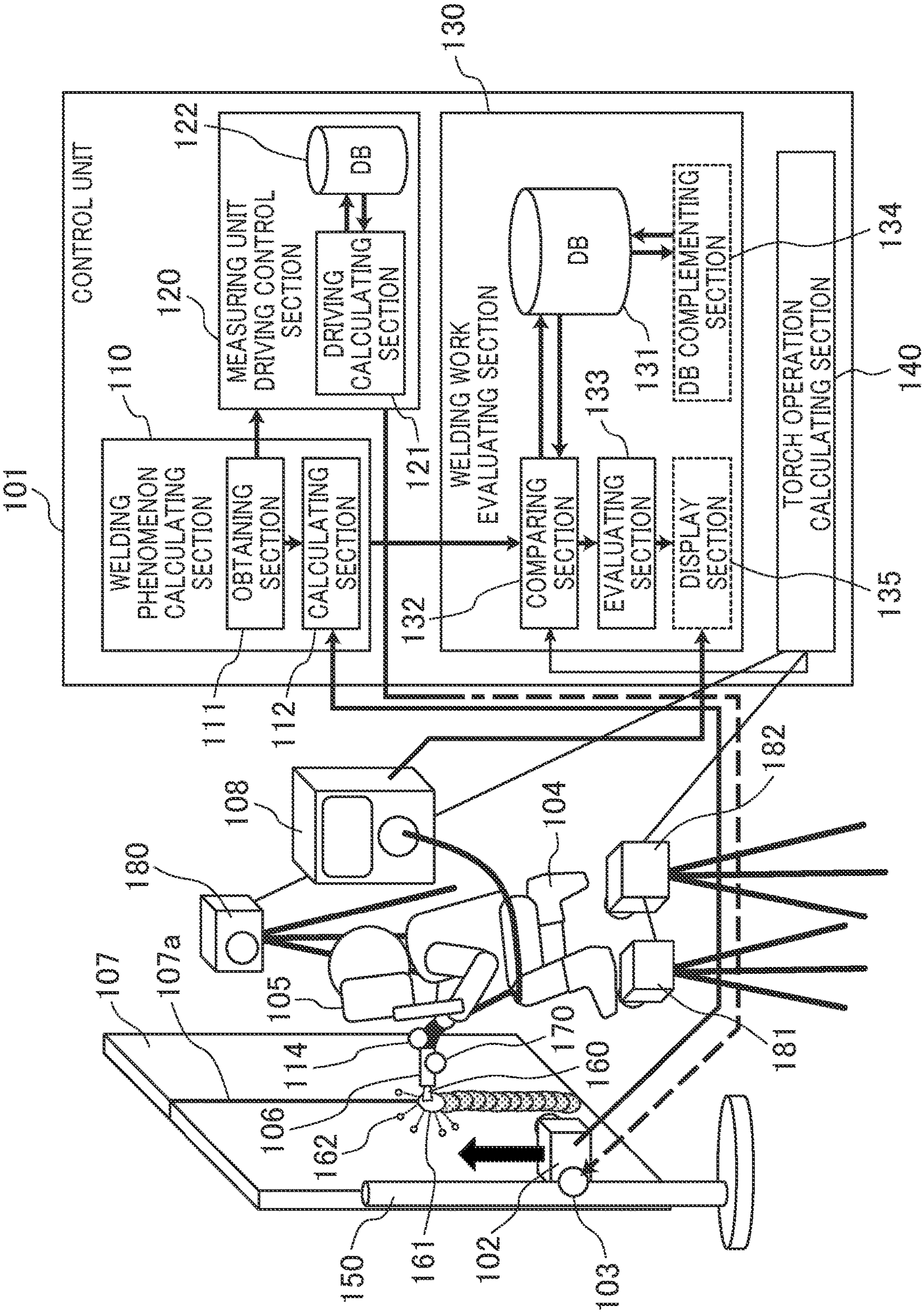
FIG. 3 is a diagram showing a general configuration of a welding measuring system in a second embodiment of the present invention.

FIG. 3 is a diagram showing a general configuration of the welding measuring system according to the present embodiment. The welding measuring system according to the present embodiment is obtained by adding a function of obtaining the operation of the torch 106 to the welding measuring system according to the first embodiment (shown in FIG. 1).

The present embodiment uses a marker type motion capture for measuring the torch 106. However, another system may also be adopted. For example, there are an acceleration and angular velocity and geomagnetism measuring device, a global positioning system (GPS: Global Positioning System), an indoor global positioning system (indoor GPS), and the speed of the measuring unit driving unit 103. In addition, two or more of these may be combined with each other. The marker type motion capture is preferable from a viewpoint of accuracy.

A marker 170 is installed on the torch 106. Marker measuring cameras 180 to 182 are arranged on the periphery of the welder 104 and the welding target object 107. The marker measuring cameras 180 to 182 can set a wavelength of light of 350 nm to 11 μm so as to avoid the wavelength of light at a time of arc welding, and irradiate the marker 170 with the light of the set wavelength. Wavelengths equal to or more than 550 nm are preferably used to avoid the light of the arc 160. Suppose that light of 850 nm is applied in the present embodiment.

The marker measuring cameras 180 to 182 are connected to the control unit 101. The speed, torch height, weaving cycle, width, torch angle, and the like of the torch 106 are calculated on the basis of the information of the measured marker 170.

Incidentally, a marker may be additionally installed on the welder 104, the face shield 105, or the like. In addition, when a welding rod is fed from a position other than the torch 106 as in TIG welding, a marker may be additionally installed on the welding rod (not shown). By installing markers on the welder 104, the face shield 105, and the welding rod, it is possible to obtain information such as the position of the body of the welder 104, the position of the head of the welder 104, and the feed amount and angle of the welding rod.

The information obtained from the marker measuring cameras 180 to 182 is sent to a torch operation calculating section 140. The torch operation calculating section 140 calculates a torch operation. The calculated torch operation is sent to the comparing section 132 of the welding work evaluating section 130.

The comparing section 132 and the evaluating section 133 refer also to the information of the torch operation calculating section 140 in addition to the above-described information of the molten pool 161, and perform evaluation. By performing this, it is possible to associate the torch operation and the welding phenomenon with each other, and consequently significantly improve an effect of evaluation of manual welding. This effect necessitates stably photographing the molten pool 161 and measuring the torch operation in detail, and is a conventionally unattainable effect.

The welding measuring system according to the present embodiment includes torch operation measuring devices 180 to 182 that measure the torch operation. The computer 101 calculates a physical quantity representing the torch operation on the basis of measurement results of the torch operation measuring devices 180 to 182.

In addition, the torch operation measuring devices 180 to 182 are cameras that photograph the torch 106. The computer 101 calculates the physical quantity representing the torch operation by the marker type motion capture.

In addition, the computer 101 in the present embodiment displays the physical quantity representing the torch operation together with the image photographed by the camera 102 and the physical quantity representing the molten pool 161.

According to the welding measuring system according to the present embodiment, it is possible to steadily photograph the welding phenomenon in manual welding in which the speed of the torch 106 changes, and by measuring the torch operation, it is possible to propose information as to a cause in a case where the welding phenomenon changes, how to change the operation, or the like.

Third Embodiment

Description of a welding operation measuring system according to a third embodiment of the present invention will be made centering on differences from the first embodiment.

Figure 4:
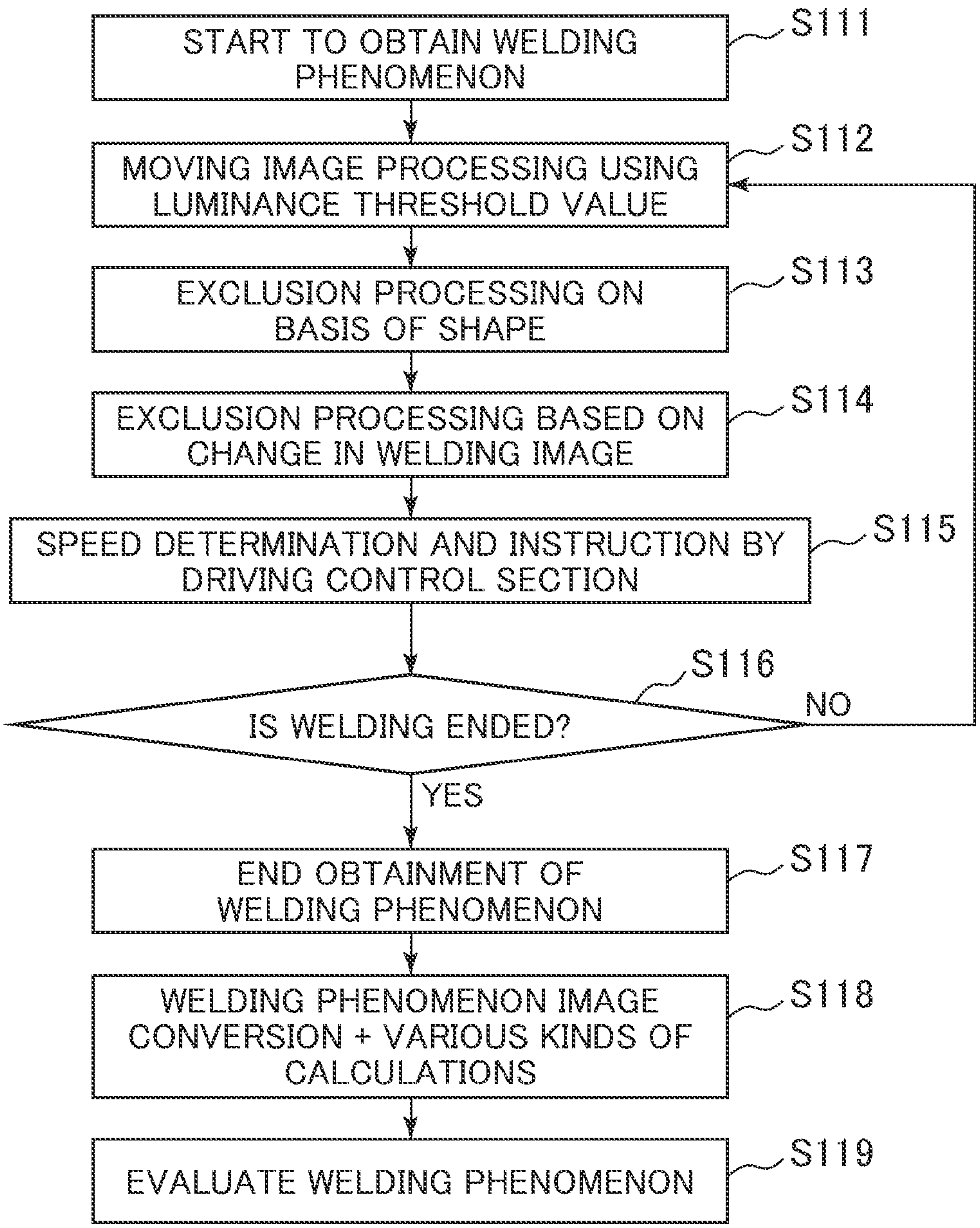
FIG. 4 is a flowchart showing processing of a control unit in a third embodiment of the present invention.

FIG. 4 is a flowchart showing processing of the control unit 101 in the present embodiment. In the following, the flowchart will be described according to a series of evaluations of actual welding work.

Steps S111 to S117 are identical to steps S101 to S107 (shown in FIG. 2) of the first embodiment.

Step S118 performs welding phenomenon image conversion and various kinds of calculations. As the calculations performed here, it is preferable to be able to extract, evaluate, and display items such as the luminance, the longitudinal length, the lateral length, the area, the circularity, and the aspect ratio of the molten pool 161, as described above. In the present embodiment, the distance from the welding phenomenon measuring unit 2 to the welding position is fixed, and therefore a hitherto impossible comparison is made possible.

In addition, as a method cited for the image conversion, the welding phenomenon measuring unit 102 is constituted by a plurality of cameras, and a plurality of images photographed at different angles are converted into an image close to a field of view of the welder 104.

An inertial sensor 114 provided to the torch 106 can measure the three-axis acceleration and three-axis angular velocity of the torch 106 (torch operation data). Incidentally, the torch operation data may be measured by a global positioning system, an indoor global positioning system, a stereo camera, or the like other than the acceleration and angular velocity and geomagnetism measuring device such as the above-described inertial sensor 114.

Step S119 evaluates the operation of the welder 104. Welding phenomenon data obtained in the past or optimum welding phenomenon data is stored in the database 131 in advance, and is compared with welding phenomenon data newly measured by the welding phenomenon measuring unit 102. The operation of the welder 104 is thereby evaluated. In addition, also for the torch operation, optimum torch operation data may be stored in the database 131 in advance, and compared with newly measured torch operation data, and thereby the operation of the welder 104 may be evaluated. It is consequently possible to present advice as to how the operation is to be improved.

The computer 101 in the present embodiment converts the viewpoint of the image photographed by the camera 102 into the viewpoint of the welder 104, and displays a resulting image.

By utilizing the welding operation measuring system according to the present embodiment for an education system and quality control, it is possible to provide the welding operation measuring system that enables handing down skills efficiently, improving craftsmanship quality, and contributing to a reduction in a defect rate.

Fourth Embodiment

Figure 5:
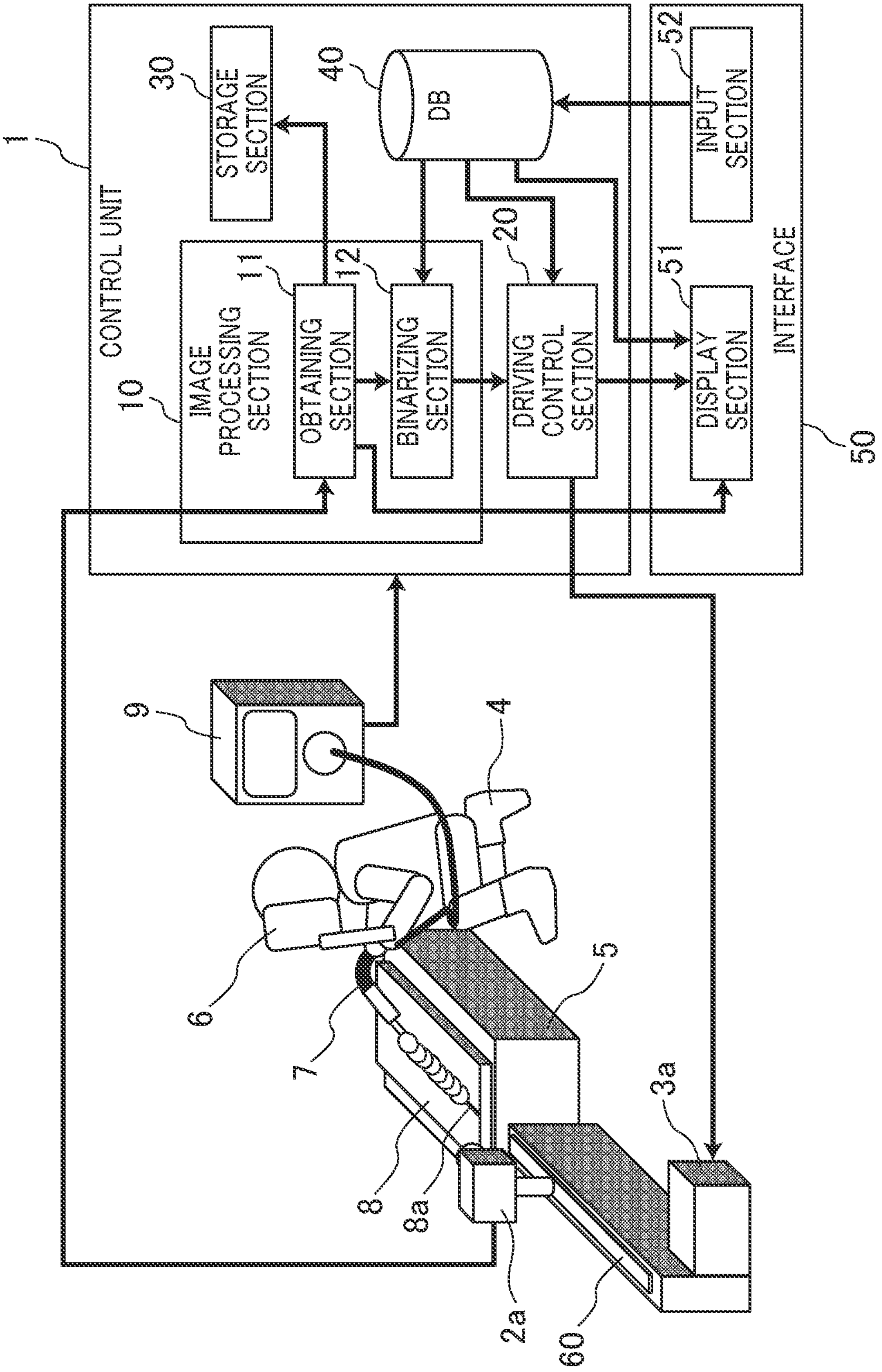
FIG. 5 is a diagram showing a general configuration of a welding measuring system in a fourth embodiment of the present invention.
Figure 6:
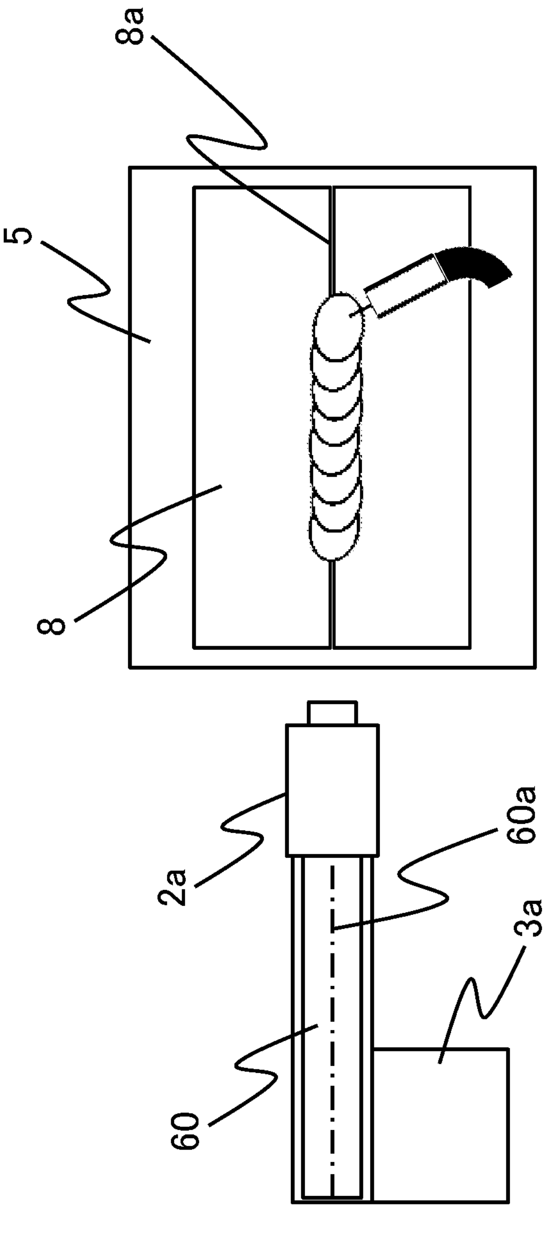
FIG. 6 is a diagram of the welding measuring system in the fourth embodiment of the present invention as viewed from above.

FIG. 5 and FIG. 6 are diagrams showing a general configuration of a welding work measuring system in a fourth embodiment of the present invention. Welding work assumes flat welding. Suppose that a test piece, which is not depicted in the figure, has a V-groove.

In FIG. 5, reference numeral 1 denotes a control unit, reference numeral 2*a* denotes a camera, reference numeral 3*a* denotes a camera driving unit, reference numeral 4 denotes a welder, reference numeral 5 denotes a work table, reference numeral 6 denotes a face shield, reference numeral 7 denotes a welding torch, reference numeral 8 denotes a welding target object, and reference numeral 9 denotes a welding power supply. The control unit 1 is, for example, a computer including a computation processing device (for example, a CPU), a storage device that stores a program to be executed by the computation processing device and data (the storage device is, for example, a semiconductor memory such as a ROM or a RAM and a magnetic storage device such as an HDD, and a "storage unit" to be described later corresponds to the storage device), and a display device (for example, a monitor or a touch panel) that displays a computation result of the computation processing device.

The control unit 1 includes: an image processing section 10 that processes an image photographed by the camera 2*a*; a driving control section 20 that controls the camera driving device 3*a*; a storage section 30 that stores data processed by the image processing section 10; and a database 40 that stores control parameters to be described later.

The image processing section 10 includes: an obtaining section 11 that obtains information such as the image photographed by the camera 2*a*; and a binarizing section 12 that binarizes the image obtained by the obtaining section 11. The binarization of the image is performed by, for example, for each pixel constituting the image, making the pixel white when the luminance of the pixel is equal to or higher than a predetermined threshold value, and making the pixel black when the luminance of the pixel is lower than the threshold value. This processing is performed to remove information other than the position and shape of an arc from the image photographed by the camera 2*a*. The threshold value for the luminance is one of the control parameters, and is set according to the kind of the filter, the diaphragm of the camera, an arc current, and the like.

The driving control section 20 calculates the centroid position of a white part (light source) in the image after the binarization, calculates a difference between the centroid position and a specified position (for example, a central position) within a photographing frame, determines a target speed of the camera 2*a* so as to reduce the difference, and outputs a control signal corresponding to the target speed to the camera driving device 3*a*. That is, the driving control section 20 calculates the centroid of the light source from the image obtained by the obtaining section 11, and performs driving control (for example, movement control) of the camera 2*a* such that the centroid of the light source continues to be displayed within a predetermined region within the image (such that the position of the centroid is limited to a displacement within the predetermined region).

The database 40 stores parameters related to the control of the welding measuring system (control parameters). The control parameters include the specified position within the photographing frame, a maximum following speed, a following gain (proportionality coefficient), a luminance threshold value, and the like.

An interface 50 is constituted by a display section 51 and an input section 52. The display section 51 displays the image obtained by the camera 2*a*, the position and the moving speed of the camera 2*a*, and the like. In addition, as required, parameters (a current value, a voltage value, a welding wire feed speed, and the like) during welding which parameters are output from the welding power supply 9 as well as the control parameters stored in the database 40 may be displayed. The display section 51 may be configured to display information to a person present outside the welding booth by using a display, or may be configured to display information in the face shield 6 by using a small display or the like and thereby sequentially feed back welding information to the welder 4. The input section 52 is a part where a system administrator or the welder 4 starts and stops the present system, and inputs the control parameters to be stored in the database 40.

The present system photographs, by the camera 2*a*, an arc occurring when the welder 4 as worker welds the welding target object 8 fixed to the work table 5 in actual welding work. The camera 2*a* is disposed on the periphery of the welder 4 and the welding target object 8. The camera 2*a* is disposed so as to be movable on a camera rail 60. The camera rail 60 is disposed along a welding line 8*a* of the welding target object 8.

A CMOS camera, a high-speed camera, a thermocamera, or the like is cited as a concrete example of the camera 2*a*. In addition, in order to obtain a welding phenomenon, it is preferable to use a light attenuating filter that cuts light as a whole as appropriate, or a short-pass filter, a long-pass filter, or a band-pass filter that cuts wavelengths, or the like. The filters may use wavelengths in a region of 900 to 1000 nm, for example. In addition, a state of less susceptibility to damage from fumes and spatters is preferably attained by using a protective glass. In addition, the camera 2*a* is not limited to one in number, but a plurality of cameras may be provided. In that case, three-dimensional conversion of the image may be performed by using principles of a stereo camera or the like.

The camera driving device 3*a* drives the camera 2*a* so as to follow the movement of the arc. More specifically, the driving control section 20 monitors the photographed image of the camera 2*a* (for example, the image binarized by the binarizing section 12) by the image processing section 10, and senses a change in the position of the centroid of the light source in the image. Then, the driving control section 20 calculates a driving condition for the camera 2*a* (a moving direction, a moving speed, a movement target position, or the like) such that the position of the centroid of the light source in the image returns to the position before the change. The driving control section 20 outputs this to the camera driving device 3*a*, and on the basis of this, the camera driving device 3*a* moves the camera 2*a* on the camera rail 60. The driving control section 20 and the camera driving device 3*a* perform this operation in real time during the welding work. Consequently, the camera 2*a* moves on the camera rail 60 so as to follow the movement of the arc.

The camera rail 60 is, for example, configured such that even when the welding work progresses, the arc continues to be photographed by moving the camera 2*a* (such that the arc continues to be included within an angle of view). For example, the present embodiment assumes that the welding line 8*a* is linear, and therefore as the camera rail 60, a linear rail is disposed so as to be parallel with the welding line 8*a*. Hence, while the present embodiment adopts a mechanism capable of driving in parallel with the welding line 8*a*, the driving may not necessarily be in parallel with the welding line 8*a*.

For example, the camera rail 60 does not need to have an exactly linear shape, and does not need to be disposed exactly in parallel with the welding line 8*a*. For example, the camera rail 60 may be slightly curved, or may be disposed so as to have a small angle with respect to the welding line 8*a*. In addition, when the welding line 8*a* is assumed to have a winding part (for example, a part forming a curve or a bending part), the camera rail 60 may have a part including a part that winds accordingly. For example, when the welding line 8*a* has an R-portion, it is preferable that the camera rail 60 be also provided with a similar R-portion in the same manner. In other words, it suffices for the camera rail 60 to be disposed along the welding line 8*a*.

Incidentally, when the camera rail 60 is disposed in parallel with the welding line 8*a*, it is possible to photograph a welding phenomenon while a photographing environment such as a distance from the camera 2*a* to the welding position and an angle of the camera 2*a* with respect to the welding position is held constant even when the torch 7 moves.

The camera driving device 3*a* preferably has a function of sending the driving condition such as the moving speed of the camera 2*a* to the control unit 1 as appropriate. In that case, the control unit 1 can evaluate the welding work and the welding quality by calculating the welding speed on the basis of the moving speed of the camera 2*a*.

Figure 7:
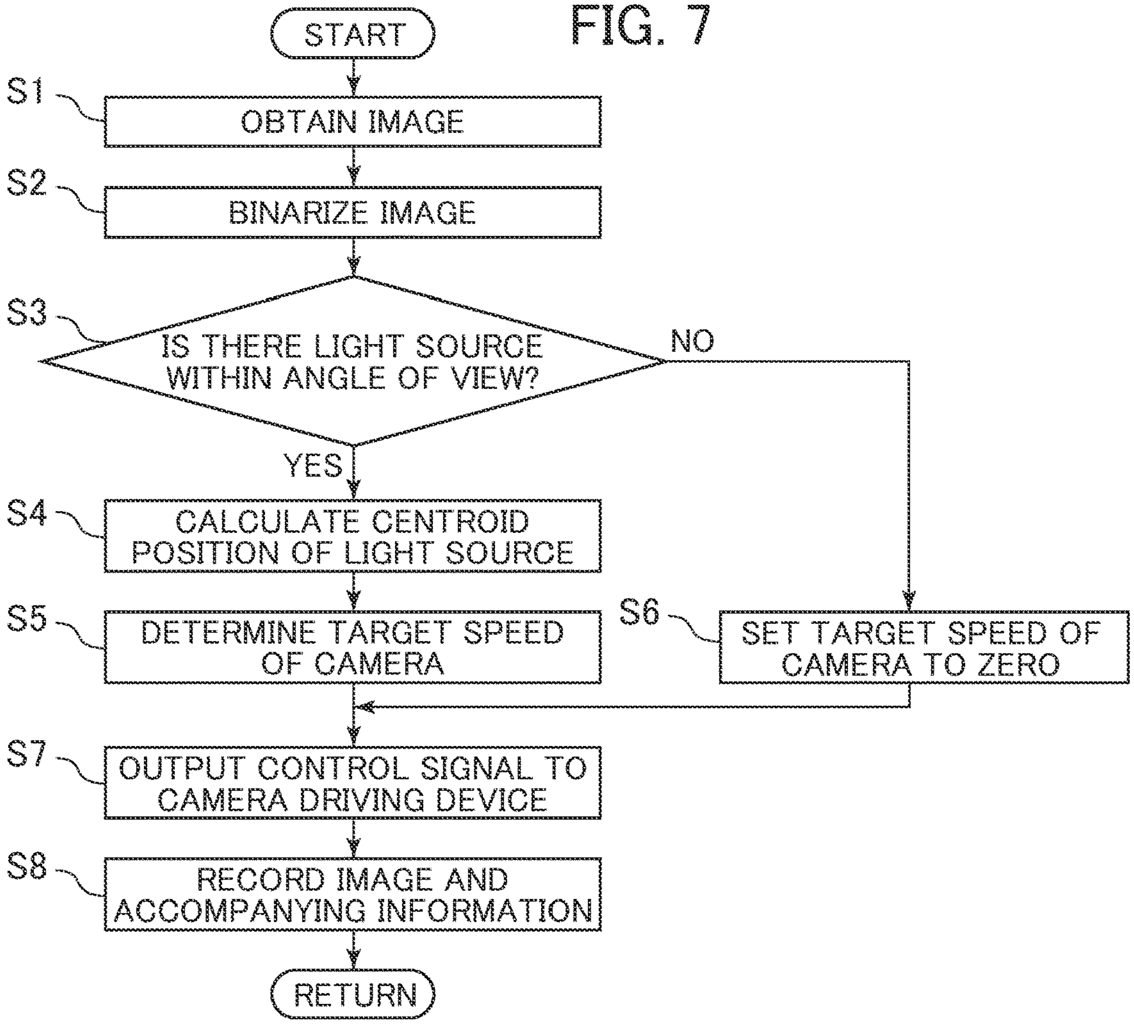
FIG. 7 is a flowchart showing processing of a control unit in the fourth embodiment of the present invention.

FIG. 7 is a flowchart showing processing of the control unit 1. The flow may be started by receiving a command of the welder 4 or another worker, or may be started automatically by detecting a rise in a current value at a time of arc ignition. Incidentally, in the present embodiment, description will be made of a case where the welder 4 adjusts the position and angle of the camera 2*a* such that a welding start point is included in the angle of view before the flow is started, and the welder 4 starts the operation of the control unit 1 by starting the camera 2*a*.

The control unit 1 first obtains an image photographed by the camera 2*a* (step S1).

Figure 8:
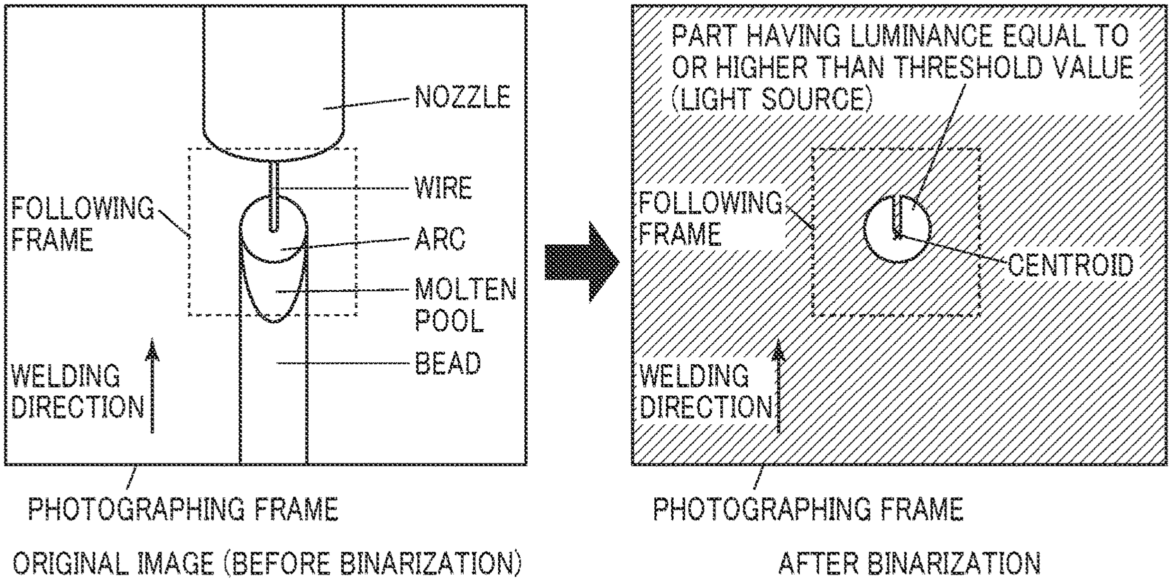
FIG. 8 is a diagram showing an example of an image photographed by a first camera in the fourth embodiment of the present invention and the image after binarization.

Following step S1, the image obtained in step S1 is binarized by using a luminance threshold value (step S2). An example of the image photographed by the camera 2*a* and the image after the binarization is shown in FIG. 8. In the image before the binarization, the nozzle, the molten pool, the wire, and the arc can each be identified, whereas in the image after the binarization, a part whose luminance is equal to or higher than the threshold value (arc) is shown in white, and parts whose luminance is lower than the threshold value (other than the arc) are shown in black. The speed of the camera 2*a* is controlled such that the arc is photographed within a following frame indicated by a broken line in the figure.

Following step S2, whether or not the light source (arc) is present within the angle of view of the camera 2*a* is determined (step S3).

When YES is determined in step S3 (the light source is present within the angle of view), the centroid position of the light source is calculated, a predetermined region including the centroid position is set, and this region is defined as a target region for making the centroid of the light source stay therein (which region will hereinafter be referred to as a following frame) (step S4). Next, a movement condition such as a target speed of the camera 2*a* is determined so as to reduce a difference between the centroid position of the light source and a specified position (for example, a central position) within the following frame (step S5). It is thereby possible to capture the arc within the following frame.

When NO is determined in step S3 (the light source is not present within the angle of view), the target speed of the camera 2*a* is set to zero (step S6). In other words, when the light source is not present within the obtained image from the beginning, when the light source that has been within the image disappears, or when the control unit 1 determines that the light source that has been within the image is moved to the outside of the angle of view, the control unit 1 sets the camera 2*a* in a stationary state, or stops the movement of the camera 2*a*. On the other hand, in the present embodiment, even when the control unit 1 determines that the light source is not present within the angle of view, the control unit 1 continues photographing operation by the camera 2*a*. Therefore, when the welding work is interrupted and the arc disappears, the photographing can be continued in a state in which the camera 2*a* is held stationary.

Following step S5 or step S6, a control signal corresponding to the target speed of the camera 2*a* is output to the camera driving device 3*a* (step S7).

Following step S7, the image obtained in step S1 and accompanying information (current, voltage, sound, time, a camera position, and the like) related to the welding work are stored in the storage device 30 (step S8). The processing then returns to step S1. Incidentally, the flow may be ended slightly after it is determined that the welding work is ended, or may be ended automatically after the passage of a predetermined time from detection of a decrease in the current value at a time of disappearance of the arc.

In addition, the control unit 1 repeatedly performs the above-described flow (for example, the flow shown in FIG. 7) until determining that the welding work is ended. For example, the welding work may be interrupted and resumed during the manual welding work. In this case, in the present embodiment, the position at which the welding is interrupted (position at which the light source has disappeared) continues to be photographed (that is, the image processing in steps S1 and S2 is continued). When the light source is sensed again, the calculation of the centroid position and the setting of the following frame in step S4, the camera movement after step 5, and the like are resumed at the position at which the welding is interrupted.

In addition, for example, the control unit 1 can determine that the welding work is ended by sensing the execution of processing for ending the operation of the camera 2*a* (for example, turning power OFF) by the welder 4. In this case, the control unit 1 ends the camera driving operation after making the determination.

Summary

In the present embodiment, the welding measuring system for measuring a welding phenomenon in manual arc welding includes: a first camera rail 60 disposed along the welding line 8*a*; a first camera 2*a* movable on the first camera rail 60; a first camera driving device 3*a* that drives the first camera 2*a*; and a computer 1 configured to sense the position of an arc within an image photographed by the first camera 2*a*, and control the first camera driving device 3*a* such that the first camera 2*a* moves at a speed at which the position of the arc continues to be displayed within a predetermined region within the image photographed by the first camera 2*a*.

According to the present embodiment configured as described above, in the manual arc welding in which the moving speed of the torch 7 changes irregularly, the arc can be captured in the predetermined region within the image photographed by the first camera 2*a*, and therefore a welding phenomenon can be photographed steadily.

In addition, the computer 1 in the present embodiment senses the centroid position of a part having luminance equal to or higher than a predetermined threshold value within the image photographed by the first camera 2*a*, and calculates the centroid position as the position of the arc. Consequently, the position of the arc can be sensed on the basis of the luminance of the image photographed by the first camera 2*a*.

In addition, the computer 1 in the present embodiment binarizes the image photographed by the first camera 2*a* according to whether or not luminance is equal to or higher than a threshold value, and calculates the centroid position of an image part having luminance equal to or higher than the threshold value as the position of the arc. Consequently, the position of the arc can be sensed in a short time, so that a capability of the first camera 2*a* to follow the arc can be improved.

In addition, the welding measuring system in the present embodiment further includes the storage device 30 that stores the image photographed by the first camera 2*a*. It is thereby possible to utilize the image photographed by the first camera 2*a* for various kinds of purposes.

In addition, the computer 1 in the present embodiment stores accompanying information of the welding phenomenon in the storage device together with the image photographed by the first camera 2*a*. It is thereby possible to check the accompanying information of the welding phenomenon together with the image photographed by the first camera 2*a*.

In addition, when the arc disappears, the computer 1 in the present embodiment controls the camera driving device 3*a* so as to stop movement of the camera 2*a*, and continues to obtain the image photographed by the camera 2*a*. In addition, a welding measuring method in the present embodiment is a welding measuring method for measuring a welding phenomenon in manual arc welding, the welding measuring method including: a step of adjusting the position of the camera 2*a* such that the welding start point is included in the angle of view of the camera 2*a* before the welding is started; a step of starting photographing by the camera 2*a* before the welding is started; a step of moving the camera 2*a* such that the position of an arc within the image photographed by the camera 2*a* continues to be displayed within a predetermined region within the image after the welding is started; and a step of stopping moving the camera 2*a* and continuing the photographing by the camera 2*a* when the arc disappears. Thus, in a case where welding work is interrupted, the welding phenomenon can be measured immediately after resumption of the welding work.

Incidentally, modes of control of the camera driving device 3*a* and the first camera 2*a* by the control unit 1 in the present embodiment are applicable also to other embodiments, for example the first to third embodiments, the control modes including, for example, binarization processing of the photographed image, the sensing of the arc position by sensing the luminance centroid, the setting of the following frame and adjustment of a movement condition such as a moving speed on the basis the setting, photographing control during a stop, the control flow (FIG. 7) of photographing, and the like.

Fifth Embodiment

Description of a fifth embodiment of the present invention will be made centering on differences from the fourth embodiment.

Figure 9:
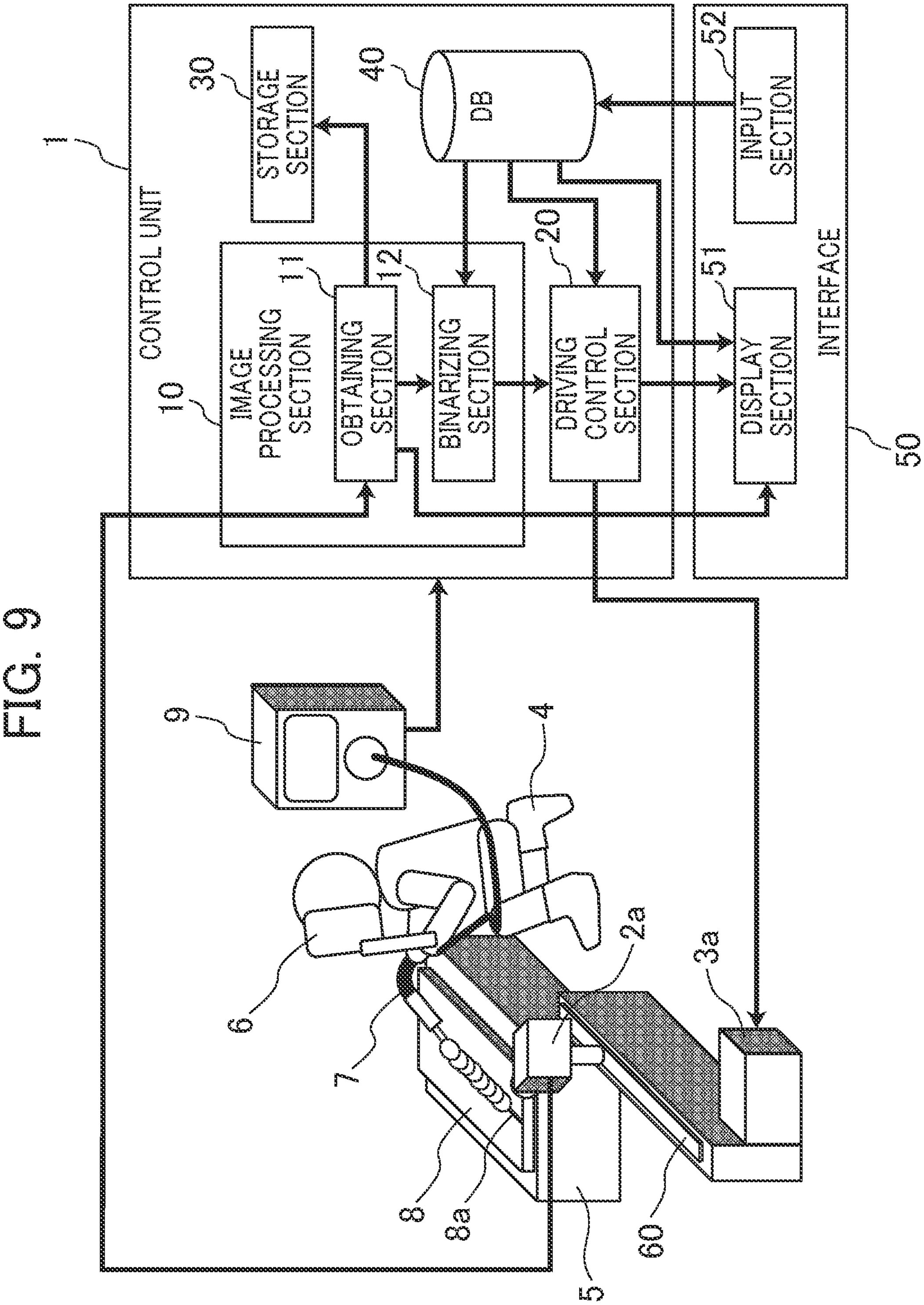
FIG. 9 is a diagram showing a general configuration of a welding measuring system in a fifth embodiment of the present invention.
Figure 10:
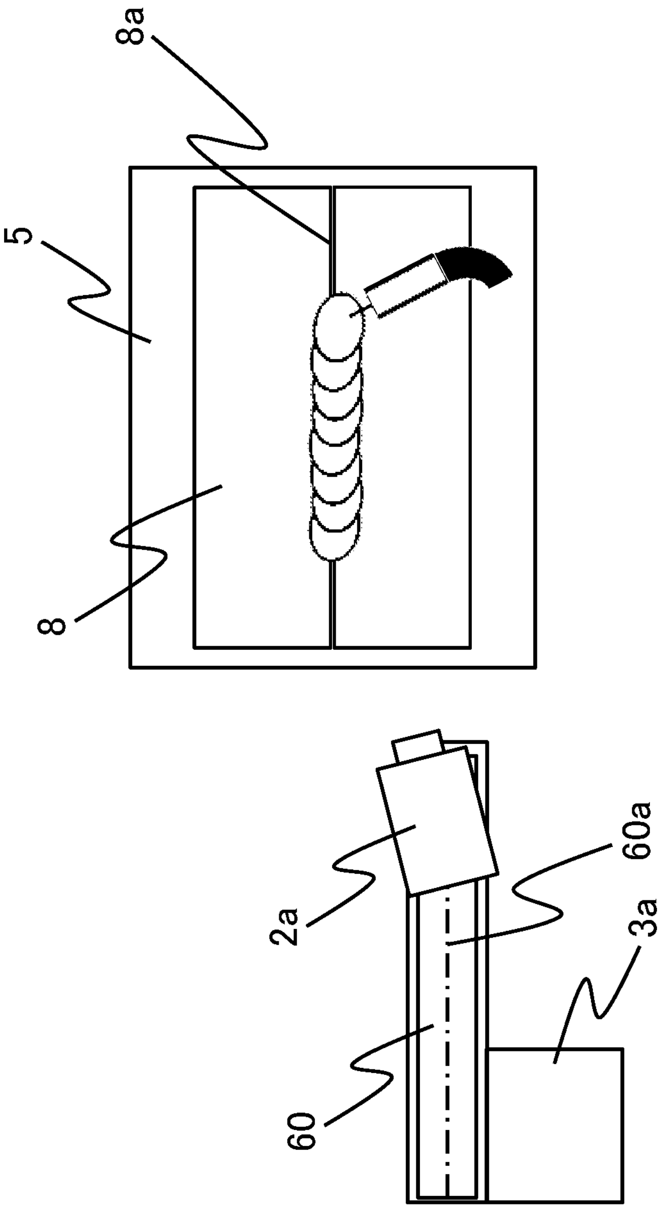
FIG. 10 is a diagram of the welding measuring system in the fifth embodiment of the present invention as viewed from above.

FIG. 9 is a diagram showing a general configuration of a welding measuring system in the present embodiment. FIG. 10 is a diagram of the welding measuring system as viewed from above.

In the fourth embodiment, the camera rail 60 is disposed such that a movement line 60*a* of the camera 2*a* and the welding line 8*a* form an identical straight line. On the other hand, in the present embodiment, the movement line 60*a* of the camera 2*a* and the welding line 8*a* are in parallel with each other, and the movement line 60*a* is disposed nearer the welder 4 than the welding line 8*a*.

The present embodiment configured as described above can also achieve effects similar to those of the first embodiment. In addition, because the disposition of the camera rail 60 is changed, the state of the arc or the like can be photographed at an angle that causes no interference with a hand or a tool of the welder 4.

Sixth Embodiment

Description of a sixth embodiment of the present invention will be made centering on differences from the fourth embodiment.

Figure 11:
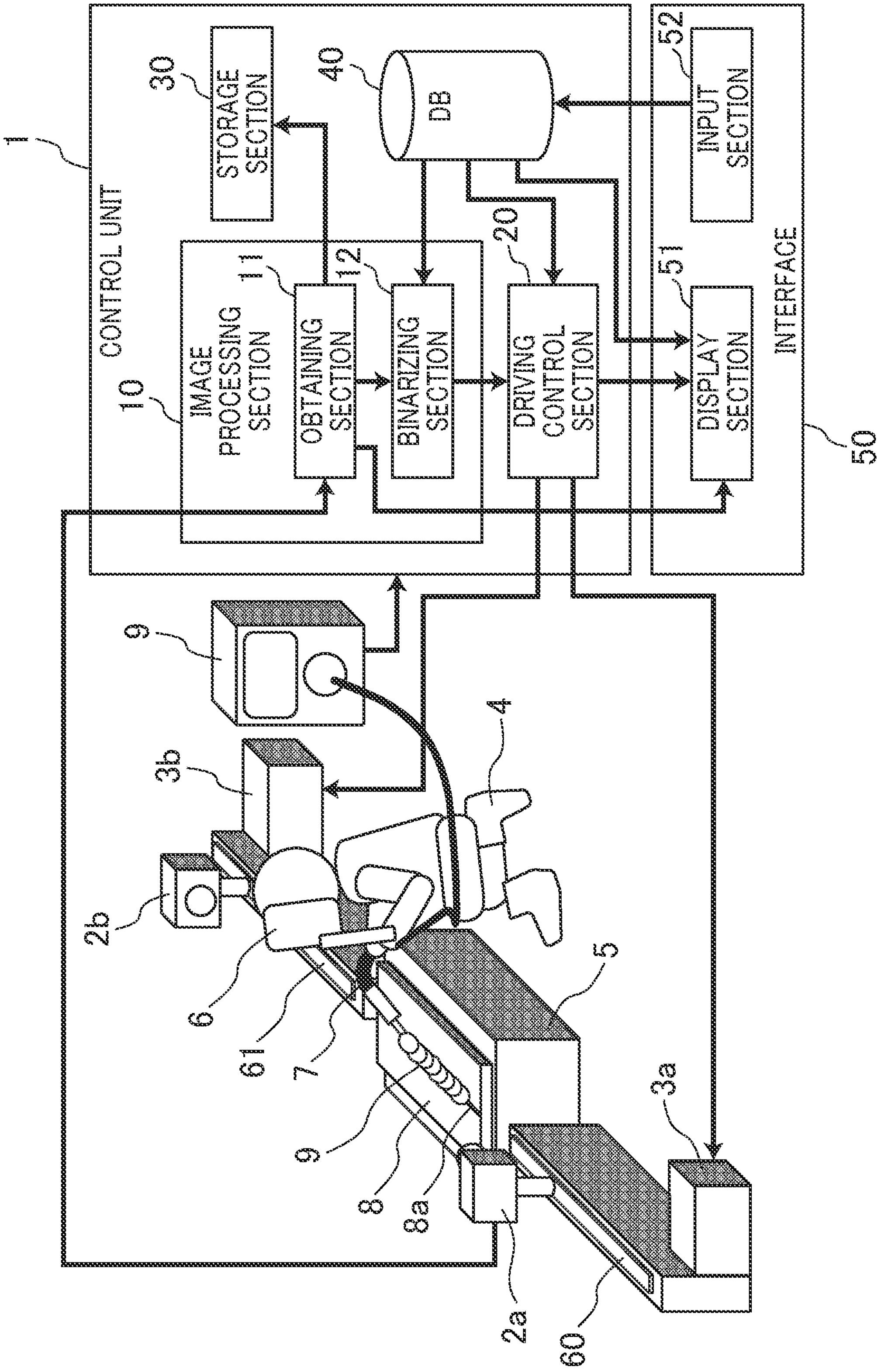
FIG. 11 is a diagram showing a general configuration of a welding measuring system in a sixth embodiment of the present invention.
Figure 12:
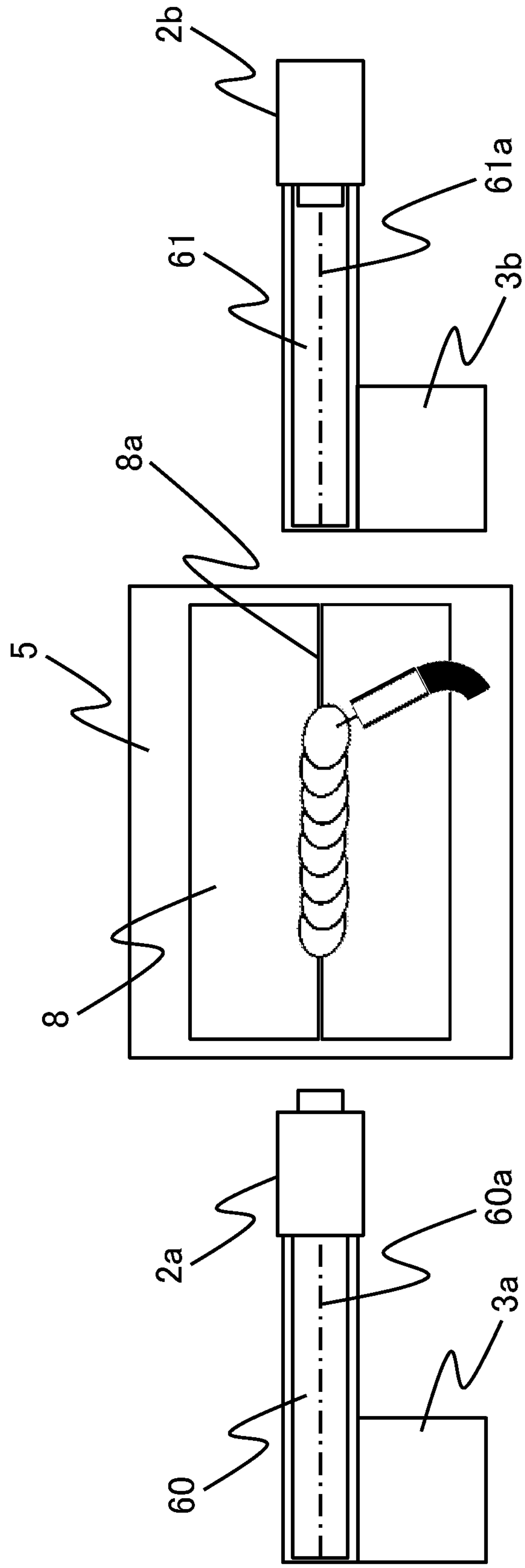
FIG. 12 is a diagram of the welding measuring system in the sixth embodiment of the present invention as viewed from above.

FIG. 11 is a diagram showing a general configuration of a welding measuring system in the present embodiment. FIG. 12 is a diagram of the welding measuring system as viewed from above.

The welding measuring system in the present embodiment further includes a second camera 2*b*, a second camera rail 61, and a second camera driving device 3*b*. The second camera rail 61 is disposed on an opposite side of the work table 5 from the first camera rail 60 and disposed such that a movement line 61*a* of the second camera 2*b* and the welding line 8*a* form an identical straight line.

In the present embodiment, the first camera 2*a* photographs the welding work together with the already welded welding line 8*a* from a rear in a direction in which the welding work is performed. On the other hand, the second camera 2*b* photographs the welding work together with the welding line 8*a* yet to be welded from a front in the direction in which the welding work is performed. Processing of the control unit 1 related to control of the second camera driving device 3*b* is similar to the processing (shown in FIG. 7) of the control unit 1 related to the control of the first camera driving device 3*a*, and therefore description thereof will be omitted.

In the present embodiment, the two camera rails (the first camera rail 60 and the second camera rail 61) are arranged such that the two camera rails are each along the welding line 8*a* and such that the welding line 8*a* is interposed between the two camera rails. The two cameras (the first camera 2*a* and the second camera 2*b*) are respectively arranged on the first camera rail 60 and the second camera rail 61 so as to photograph the welding line 8*a* at angles of view such that the two cameras face each other with the welding line 8*a* interposed therebetween. In addition, in the present embodiment, the first camera 2*a* and the second camera 2*b* are driving-controlled so as to move in such a manner as to be interlocked with each other (in a same direction and at a same speed in the present embodiment).

Figure 13:
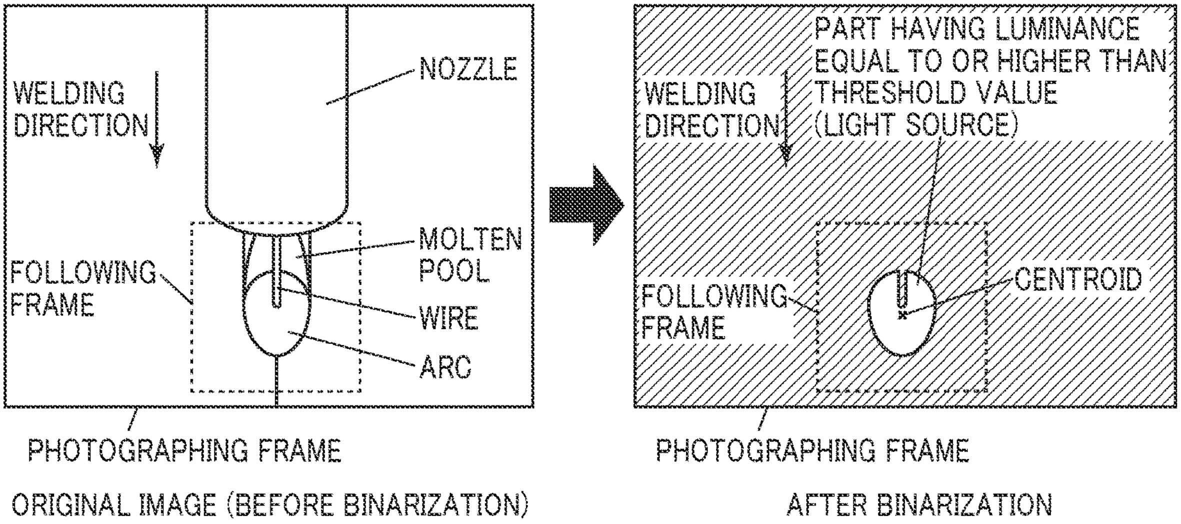
FIG. 13 is a diagram showing an example of an image photographed by a second camera in the sixth embodiment of the present invention and the image after binarization.

FIG. 13 shows an example of an image photographed by the second camera 2*b* and the image after binarization. The control unit 1 binarizes the image photographed by the second camera 2*b*, calculates the centroid position of the light source, and controls the second camera driving device 3*b* such that the second camera 2*b* moves so as to reduce a difference between the centroid position of the light source (arc) and a predetermined position within the image. Incidentally, an example of an image photographed by the first camera 2*a* and the image after binarization is as shown in FIG. 8.

Summary

The welding measuring system in the present embodiment further includes: the second camera rail 61 disposed along the welding line 8*a*; the second camera 2*b* movable on the second camera rail 61; and the second camera driving device 3*b* that drives the second camera 2*b*. The computer 1 senses the position of the arc within the image photographed by the second camera 2*b*, and controls the second camera driving device 3*b* so as to move the second camera 2*b* at a speed such that the arc continues to be displayed within a predetermined region within the image photographed by the second camera 2*b*.

According to the present embodiment configured as described above, it is possible to steadily photograph the welding phenomenon from a plurality of directions in manual arc welding in which the moving speed of the torch changes irregularly.

In addition, the first camera rail 60 and the second camera rail 61 in the present embodiment are each arranged with the welding line 8*a* interposed between the first camera rail 60 and the second camera rail 61 such that the movement line 60*a* of the first camera 2*a*, the movement line 61*a* of the second camera 2*b*, and the welding line 8*a* form an identical straight line. Thus, both of a state before the welding and a state after the welding can be photographed irrespective of whether the welder 4 is right-handed or left-handed.

Embodiments of the present invention have been described above in detail. However, the present invention is not limited to the foregoing embodiments, but includes various modifications. For example, the foregoing embodiments have been described in detail in order to describe the present invention in an easily understandable manner, and are not necessarily limited to the embodiments including all of the described configurations. In addition, it is possible to add a part of a configuration of another embodiment to a configuration of a certain embodiment, and it is possible to omit a part of a configuration of a certain embodiment or replace a part of a configuration of a certain embodiment with a part of another embodiment.

DESCRIPTION OF REFERENCE CHARACTERS

1: Control unit (computer)
2*a*: Camera (first camera)
2*b*: Second camera
3*a*: Camera driving device (first camera driving device)
3*b*: Second camera driving device
4: Welder
5: Work table
6: Face shield
7: Torch
8: Welding target object
8*a*: Welding line
9: Welding power supply
10: Image processing section
11: Obtaining section
12: Binarizing section
20: Driving control section
30: Storage unit (storage device)
40: Database
50: Interface
51: Display section
52: Input section
60: Camera rail (first camera rail)
60*a*: Movement line
61: Second camera rail
61*a*: Movement line
101: Control unit (computer)
102: Welding phenomenon measuring unit (camera)
103: Measuring unit driving unit (camera driving device)

104: Welder
105: Face shield
106: Torch
107: Welding target object
108: Semiautomatic welding power supply
110: Welding phenomenon calculating section
111: Obtaining section
112: Calculating section
114: Inertial sensor
120: Measuring unit driving control section
121: Driving calculating section
122: Database
130: Welding work evaluating section
131: Database
132: Comparing section
133: Evaluating section
134: Database complementing section
135: Display section
140: Torch operation calculating section
150: Camera rail
160: Arc
161: Molten pool
162: Spatter
170: Marker
180 to 182: Marker measuring camera (torch operation measuring device)

The invention claimed is:

1. A welding measuring system for measuring a welding phenomenon in manual arc welding, the welding measuring system comprising:
- a first camera rail disposed along a welding line;
- a first camera movable on the first camera rail;
- a first camera driving device that drives the first camera; and
- a computer configured to sense a position of an arc within an image photographed by the first camera, and control the first camera driving device such that the first camera moves at a speed at which the position of the arc continues to be displayed within a predetermined region within the image photographed by the first camera.

2. The welding measuring system according to claim 1, wherein
- the computer is configured to sense a centroid position of a part having luminance equal to or higher than a predetermined threshold value within the image photographed by the first camera, and calculate the centroid position as the position of the arc.

3. The welding measuring system according to claim 2, wherein
- the computer is configured to binarize the image photographed by the first camera according to whether or not luminance is equal to or higher than a threshold value, and calculate the centroid position of an image part having luminance equal to or higher than the threshold value as the position of the arc.

4. The welding measuring system according to claim 1, further comprising:
- a storage device that stores the image photographed by the first camera.

5. The welding measuring system according to claim 4, wherein
- the computer is configured store accompanying information of the welding phenomenon in the storage device together with the image photographed by the first camera.

6. The welding measuring system according to claim 1, further comprising:
- a second camera rail disposed along the welding line;
- a second camera movable on the second camera rail; and
- a second camera driving device that drives the second camera; wherein
- the computer is configured to sense the position of the arc within an image photographed by the second camera, and control the second camera driving device so as to move the second camera such that the position of the arc continues to be displayed within a predetermined region within the image photographed by the second camera.

7. The welding measuring system according to claim 6, wherein
- the first camera rail and the second camera rail are each arranged with the welding line interposed between the first camera rail and the second camera rail such that a movement line of the first camera, a movement line of the second camera, and the welding line form an identical straight line.

8. The welding measuring system according to claim 1, wherein
- the computer is configured to control the first camera driving device so as to stop movement of the first camera and continues to obtain the image photographed by the first camera in a case where the arc disappears.

* * * * *